UNITED STATES PATENT OFFICE.

MARIA LONGWORTH NICHOLS, (NOW MARIA LONGWORTH STORER,) OF CINCINNATI, OHIO.

MANUFACTURE OF POTTERY.

SPECIFICATION forming part of Letters Patent No. 361,231, dated April 12, 1887.

Application filed December 21, 1885. Serial No. 186,407. (Specimens.)

*To all whom it may concern:*

Be it known that I, MARIA LONGWORTH NICHOLS, (now MARIA LONGWORTH STORER,) a citizen of the United States, residing at Cincinnati, in the county of Hamilton and State of Ohio, have invented certain new and useful Improvements in the Manufacture of Pottery, of which the following is a specification.

My invention relates to the chromatic ornamentation of pottery; and it consists in applying coloring material at several successive stages of the manufacture. I prefer to apply it, first, in the clay itself, so that such coloring material becomes an ingredient in the composition of the ware; second, by pigments applied to the surface of the ware before the application of the glaze, and, third, in the glaze itself; but beneficial results may be obtained by its application in the clay and in the glaze without applying it to the surface of the ware, and by its application to the surface of the ware and in the glaze without applying it in the clay. By these means I obtain greater depth and richness of color and more delicate blending of color with color, and transition from shade to shade, than by any admixture of colors before application.

My process of manufacture is as follows: The clay of which the ware is composed is first given any desired color, either by the introduction of coloring material therein, by the selection of clays having by nature the desired color, or by a suitable admixture of clays of different natural hues. The clay is then fashioned into the shape which the finished ware is to assume. Pigments of any desired color or variety of colors and blended in any desired manner are applied to the surface, and at this stage any arbitrary design may be laid on in color. This application of color may take place after the first firing instead of before, but for most purposes I prefer to apply it before. The ware having been fired, I apply to the surface thereof a glaze in which has been introduced coloring-matter of any desired hue. I prefer to introduce different colors or different shades at each of these successive stages before mentioned. After the glaze has been applied the ware is subjected to the second firing in the usual way.

As above stated, the application of coloring-matter in the material of which the ware is composed, and to the glaze without applying it to the surface of the ware, and the application to the surface of the ware, and in the glaze without applying it in the material, are within my invention.

I claim—

1. The process of manufacturing pottery, consisting in applying color for the ornamentation thereof, first, in the material composing the ware, and, second, in the glaze to be applied after the first firing and before the second firing thereof.

2. The process of manufacturing pottery, consisting in applying color for the ornamentation thereof, first, to the surface of the ware, and, second, in the glaze to be applied after the first firing and before the second firing thereof.

3. The process of manufacturing pottery, consisting in applying color for the ornamentation thereof, first, in the material composing the ware; second, to the surface of the ware, and, third, in the glaze to be applied after the first firing and before the second firing thereof.

4. As an improvement in pottery, a ware ornamented by having color applied thereto, first, in the material composing the same, and, second, in the glaze applied thereto intermediately between the first and second firing thereof.

5. As an improvement in pottery, a ware ornamented by having color applied thereto, first, by pigments applied to the surface of the ware, and, second, in the glaze applied thereto intermediately between the first and second firing thereof.

6. As an improvement in pottery, a ware ornamented by having color applied thereto, first, in the material composing the same; second, by pigments applied to the surface of the ware, and, third, in the glaze applied thereto intermediately between the first and second firing thereof.

MARIA LONGWORTH NICHOLS.

Witnesses:
BELLAMY STORER,
ARTHUR LE BOUTILLIER.